United States Patent
Tanaka et al.

(10) Patent No.: US 12,027,710 B2
(45) Date of Patent: Jul. 2, 2024

(54) ACTIVE MATERIAL AND ALL-SOLID SECONDARY BATTERY

(71) Applicant: TDK CORPORATION, Tokyo (JP)

(72) Inventors: Teiichi Tanaka, Tokyo (JP); Takeo Tsukada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 511 days.

(21) Appl. No.: 16/975,436

(22) PCT Filed: Feb. 21, 2019

(86) PCT No.: PCT/JP2019/006507
§ 371 (c)(1),
(2) Date: Aug. 25, 2020

(87) PCT Pub. No.: WO2019/167783
PCT Pub. Date: Sep. 6, 2019

(65) Prior Publication Data
US 2020/0395619 A1    Dec. 17, 2020

(30) Foreign Application Priority Data

Feb. 27, 2018 (JP) .................................. 2018-033252

(51) Int. Cl.
*H01M 4/66* (2006.01)
*H01M 4/36* (2006.01)
(Continued)

(52) U.S. Cl.
CPC ........... *H01M 4/661* (2013.01); *H01M 4/366* (2013.01); *H01M 4/58* (2013.01);
(Continued)

(58) Field of Classification Search
CPC ........ H01M 4/661; H01M 4/366; H01M 4/58; H01M 10/525; H01M 10/562; H01M 2300/0071
See application file for complete search history.

(56) References Cited

U.S. PATENT DOCUMENTS

| 5,871,866 A | 2/1999 | Barker et al. |
| 2012/0219862 A1 | 8/2012 | Fujino et al. |

(Continued)

FOREIGN PATENT DOCUMENTS

| CN | 103896239 A | 7/2014 |
| JP | 2000-086215 A | 3/2000 |

(Continued)

OTHER PUBLICATIONS

Dong, Y. Z., Y. M. Zhao, and H. Duan. "The effect of doping Mg2+ on the structure and electrochemical properties of Li3V2 (PO4) 3 cathode materials for lithium-ion batteries." Journal of Electroanalytical Chemistry 660.1 (2011): 14-21. (Year: 2011).*

(Continued)

*Primary Examiner* — Milton I Cano
*Assistant Examiner* — Albert Michael Hilton
(74) *Attorney, Agent, or Firm* — Oliff PLC

(57) ABSTRACT

An active material is represented by a chemical formula $Li_{3+a}V_{2-x}M_x(PO_4)_3$ ($-0.35 \le a \le 0.7$, $0 < x \le 51.4$), and M is an element to be a divalent or tetravalent cation in a crystal structure.

8 Claims, 1 Drawing Sheet

(51) Int. Cl.
  *H01M 4/58*      (2010.01)
  *H01M 10/0525*   (2010.01)
  *H01M 10/0562*   (2010.01)

(52) U.S. Cl.
  CPC ... *H01M 10/0525* (2013.01); *H01M 10/0562* (2013.01); *H01M 2300/0071* (2013.01)

(56)         References Cited

U.S. PATENT DOCUMENTS

2012/0295163 A1*  11/2012  Yanagita .............. H01M 4/523
                                                    252/519.51
2015/0333330 A1   11/2015  Sato et al.
2015/0333366 A1*  11/2015  Sato ................. H01M 10/0525
                                                       429/319
2020/0014070 A1    1/2020  Oishi et al.

FOREIGN PATENT DOCUMENTS

WO      2011/052632 A1    5/2011
WO      2018/026009 A1    2/2018

OTHER PUBLICATIONS

May 21, 2019 International Search Report issued in International Patent Application No. PCT/JP2019/006507.
Y.Z. Dong et al. "The Effect of Doping Mg2+ on the Structure and Electrochemical Properties of Li3V2(PO4)3 Cathode Materials for Lithium-Ion Batteries". Journal of Electroanalytical Chemistry, vol. 660, 2011, pp. 14-21.
Chunwen Sun et al. "Hydrothermal Synthesis and Electrochemical Properties of Li3V2(PO4)3/C-Based Composites for Lithium-Ion Batteries". Applied Materials & Interfaces, vol. 3, 2011, pp. 3772-3776.
Mar. 30, 2023 Office Action issued in Chinese Patent Application No. 201980014377.3.
Liu et al., "Study on the modifying of Li3V2 (PO4)3 by Ni doping," Journal of Huazhong Normal University (Nat. Sci.), vol. 42, No. 4, pp. 578-581, 2008.
Feb. 7, 2023 Office Action issued in Japanese Patent Application No. 2020-503451.
Jun. 28, 2023 Office Action issued in Chinese Patent Application No. 201980014377.3.

* cited by examiner

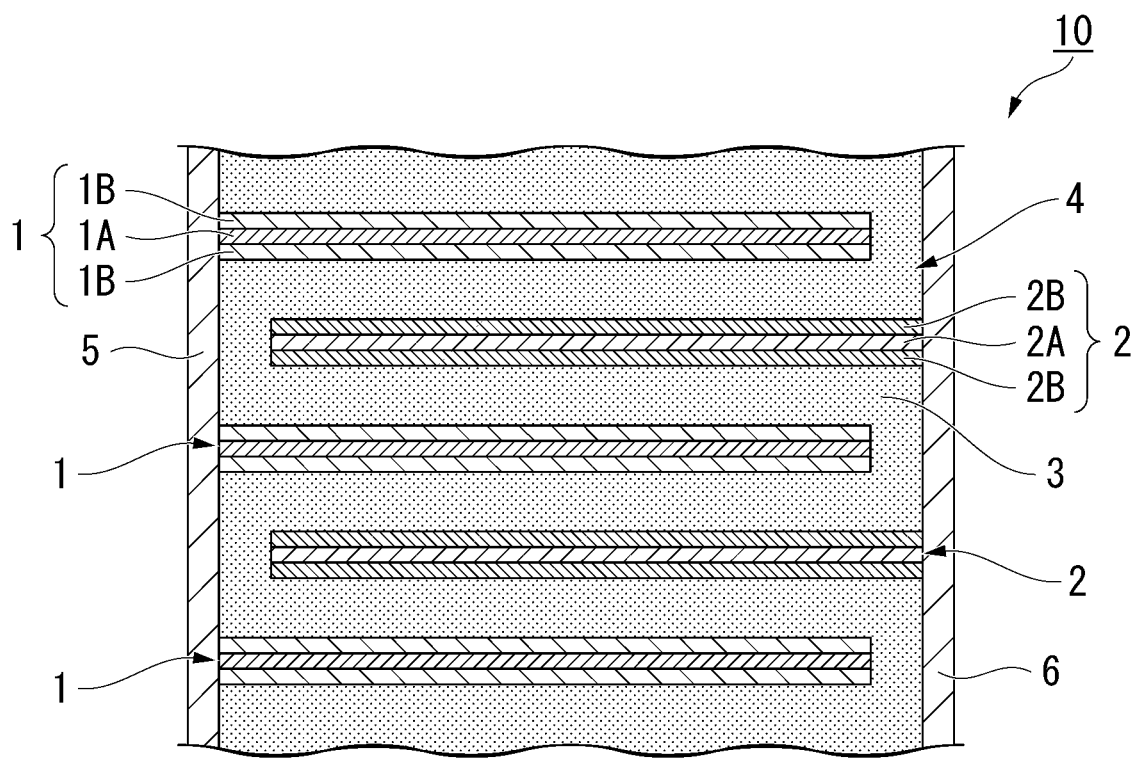

ACTIVE MATERIAL AND ALL-SOLID SECONDARY BATTERY

TECHNICAL FIELD

The present disclosure relates to an active material and an all-solid secondary battery. Priority is claimed on Japanese Patent Application No. 2018-033252, filed Feb. 27, 2018, the content of which is incorporated herein by reference.

BACKGROUND ART

Lithium ion secondary batteries are widely used as power supplies for portable small devices, for example, mobile phones, laptops, and PDAs. Lithium ion secondary batteries used for such portable small devices are required to be smaller, thinner and more reliable.

Regarding lithium ion secondary batteries, those in which an organic electrolytic solution is used as an electrolyte and those using a solid electrolyte are known. Compared to a lithium ion secondary battery using an organic electrolytic solution, a lithium ion secondary battery (all-solid secondary battery) in which a solid electrolyte is used as an electrolyte has advantages that it has a higher degree of freedom in design of the shape of the battery and a small-sized and thin battery can be easily obtained, and the reliability is high without leaking of an electrolytic solution.

On the other hand, generally, all-solid secondary batteries have lower lithium ions conductivity than lithium ion secondary batteries using an organic electrolytic solution. In addition, it is difficult to add a conductivity aid to an active material part and electron conductivity is low. Therefore, all-solid secondary batteries have problems such as having a higher internal resistance and lower output current than lithium ion secondary batteries using an organic electrolytic solution. Therefore, in all-solid secondary batteries, it is required to reduce the internal resistance by increasing the ion conductivity of lithium ions and the electron conductivity of the active material.

For example, in Patent Literature 1, some of $PO_4$ anions of an active material for a $Li_3V_2(PO_4)_3$-based lithium secondary battery are substituted with $BO_3$ anions, and thus excellent storage performance, and particularly, maintenance of high temperature performance is provided. In this embodiment, it is important that carbon be attached by coating to the surface of the active material and thus electron conductivity be supplemented during use.

CITATION LIST

Patent Literature

[Patent Literature 1]
WO 2011/052632

SUMMARY OF INVENTION

Technical Problem

However, in order to improve the volume energy density of an all-solid secondary battery, an active material ratio between a positive electrode active material layer and a negative electrode active material layer is preferably high and it is preferable to use active materials without mixing in a conductivity aid such as carbon. Therefore, it is required to improve the electron conductivity of the active material itself. When the electron conductivity of the positive electrode active material and the negative electrode active material is improved, the internal resistance of the all-solid secondary battery can be further reduced.

The present disclosure has been made in view of the above circumstances, and provides an active material having high electron conductivity and an all-solid secondary battery including the active material.

Solution to Problem

In order to address the above problems, the inventors conducted extensive studies. As a result, they found that, when some of V (vanadium) of a conventional active material $Li_3V_2(PO_4)_3$ (hereinafter abbreviated as LVP) is replaced with an element to be a divalent or tetravalent cation, high electron conductivity is obtained.

In order to solve the above problems, the following aspects are provided.

(1) An active material according to a first aspect is represented by the chemical formula $Li_{3+a}V_{2-x}M_x(PO_4)_3$ ($-0.3 \le a \le 0.7$, $0 < x \le 1.4$), wherein M is an element to be a divalent or tetravalent cation in a crystal structure.

(2) In the active material according to the above aspect, an element represented as M in the chemical formula may be one or more elements selected from the group consisting of Mg, Ca, Ti and Zr.

(3) In the active material according to the above aspect, x may satisfy $0.2 \le x \le 1.1$.

(4) An all-solid secondary battery according to a second aspect includes the active material according to any one of the first aspects.

(5) The all-solid secondary battery according to the above aspect may include an oxide-based solid electrolyte layer containing an element represented as M in this chemical formula.

(6) The all-solid secondary battery according to the above aspect may include a positive electrode current collector layer and a negative electrode current collector layer, wherein the positive electrode current collector layer may contain a positive electrode active material, the negative electrode current collector layer may contain a negative electrode active material, a ratio between the content of the positive electrode current collector and the active material contained in the positive electrode current collector layer may be in a range of 90/10 to 70/30, and a ratio between the content of the negative electrode current collector and the active material contained in the negative electrode current collector layer may be in a range of 90/10 to 70/30.

Advantageous Effects of Invention

The active material according to the above aspect has high electron conductivity.

BRIEF DESCRIPTION OF DRAWINGS

FIG. 1 is a schematic view showing an example of a cross-section of an all-solid secondary battery according to a first embodiment.

DESCRIPTION OF EMBODIMENTS

Preferable examples of the present disclosure will be appropriately described below in detail with reference to the drawings. In the drawings used in the following description, in order to facilitate understanding of features of the present disclosure, feature parts are enlarged for convenience of illustration in some cases. Therefore, ratios between sizes and the like of components illustrated in the drawings may be different from those of actual components. Materials, sizes and the like exemplified in the following description are examples, the present disclosure is not limited thereto, and they can be appropriately changed within a range in which effects thereof are obtained. The present disclosure is not limited to the following embodiments, and they can be appropriately changed within a range in which effects thereof are obtained. For example, numbers, numerical values, amounts, ratios, features, and the like can be omitted, added, and changed without departing from the spirit and scope of the present disclosure.

[All-Solid Secondary Battery]

FIG. 1 is a schematic view schematically showing an example of a cross-section of an all-solid secondary battery 10 according to the present embodiment.

The all-solid secondary battery 10 shown in FIG. 1 includes at least one first electrode layer 1, at least one second electrode layer 2, and a solid electrolyte 3 interposed between the first electrode layer 1 and the second electrode layer 2. A laminate 4 has a configuration in which the first electrode layer 1, the solid electrolyte 3, and the second electrode layer 2 are laminated in this order. Each of the first electrode layers 1 is connected to a terminal electrode 5 arranged on one end side. Each of the second electrode layers 2 is connected to a terminal electrode 6 arranged on the other end side.

Here, in the present embodiment, the vertical direction will be defined, and then the positional relationships between respective configurations will be described. Hereinafter, the upward in FIG. 1 will be referred to as the upward direction and downward in FIG. 1 will be referred to as the downward direction. Here, the orientation of the configuration of the secondary solid battery according to the present embodiment is not limited, and the configuration may be inverted.

One of the first electrode layer 1 and the second electrode layer 2 functions as a positive electrode layer and the other thereof functions as a negative electrode layer. Hereinafter, in order to facilitate understanding, in the present embodiment, a case in which the first electrode layer 1 is the positive electrode layer 1 and the second electrode layer 2 is the negative electrode layer 2 will be exemplified. However, the present embodiment is not limited to a configuration in which the first electrode layer 1 is a positive electrode layer and the second electrode layer 2 is a negative electrode layer, and may be a configuration in which the first electrode layer 1 is a negative electrode layer and the second electrode layer is a positive electrode layer. Hereinafter, in this specification, the reference numeral 1 indicates the positive electrode layer and the reference numeral 2 indicates the negative electrode layer.

As shown in FIG. 1, the positive electrode layer 1 and the negative electrode layer 2 are alternately laminated with the solid electrolyte 3 therebetween. The all-solid secondary battery is charged when lithium ions are transferred between the positive electrode layer 1 and the negative electrode layer 2 with the solid electrolyte 3 therebetween.

<Positive Electrode Layer and Negative Electrode Layer>

The positive electrode layer 1 includes a positive electrode current collector layer 1A and a positive electrode active material layer 1B containing a positive electrode active material. The negative electrode layer 2 includes a negative electrode current collector layer 2A and a negative electrode active material layer 2B containing a negative electrode active material.

The positive electrode current collector layer 1A and the negative electrode current collector layer 2A preferably have high conductivity. Therefore, it is preferable to use, for example, silver, palladium, gold, platinum, aluminum, copper, nickel, or the like for the positive electrode current collector layer 1A and the negative electrode current collector layer 2A. Among these materials, copper is unlikely to react with a positive electrode active material, a negative electrode active material or a solid electrolyte. Therefore, when copper is used for the positive electrode current collector layer 1A and the negative electrode current collector layer 2A, the internal resistance of the all-solid secondary battery 10 can be reduced. Here, materials constituting the positive electrode current collector layer 1A and the negative electrode current collector layer 2A may be the same as or different from each other.

The positive electrode active material layer 1B is formed on one surface or both surfaces of the positive electrode current collector layer 1A. For example, when the positive electrode layer 1 is formed as the uppermost layer of the laminate 4 in the lamination direction between the positive electrode layer 1 and the negative electrode layer 2, there is no opposing negative electrode layer 2 on the positive electrode layer 1 positioned on the uppermost layer. That is, in the positive electrode layer 1 positioned on the uppermost layer, the positive electrode active material layer 1B may be provided only on one surface on the lower side in the lamination direction.

As in the positive electrode active material layer 1B, the negative electrode active material layer 2B is also formed on one surface or both surfaces of the negative electrode current collector layer 2A. In addition, when the negative electrode layer 2 is formed as the lowermost layer of the laminate 4 in the lamination direction between the positive electrode layer 1 and the negative electrode layer 2, the negative electrode active material layer 2B in the negative electrode layer 2 positioned on the lowermost layer may be provided only on one surface on the upper side in the lamination direction.

The positive electrode active material layer 1B contains a positive electrode active material that transfers electrons. In addition, the negative electrode active material layer 2B contains a negative electrode active material that transfers electrons. In addition, the positive electrode active material layer 1B and the negative electrode active material layer 2B may contain a conductivity aid, a binding agent, and the like. Preferably, the positive electrode active material and the negative electrode active material can efficiently occlude and release lithium ions.

Regarding the negative electrode active material and the positive electrode active material, an active material in which some of V in $Li_3V_2(PO_4)_3$ is replaced with another element M and additionally a composition amount of Li is adjusted is used. Specifically, the negative electrode active material and the positive electrode active material are an active material represented by a chemical formula $Li_{3+a}V_{2-x}M_x(PO_4)_3$ ($-0.35 \leq a \leq 0.7$, $0 < x \leq 1.4$). Here, an active material in which M is an element to be a divalent or tetravalent cation in the crystal structure is used. In addition, the composition amount of Li is preferably $-0.35 \leq a \leq 0.7$, more preferably $-0.2 \leq a \leq 0.6$, and most preferably $-0.1 \leq a \leq 0.4$. When the composition amount of Li is set within the above range, high electron conductivity can be obtained.

According to such an active material in which some of V in $Li_3V_2(PO_4)_3$ is replaced with another element M, higher electron conductivity than that of an active material $Li_3V_2(PO_4)_3$ in which no element is replaced is obtained. When there is replacement with an element that can become a divalent cation, oxygen deficiency is more likely to occur in the crystal lattice and free electrons are generated due to the occurrence of oxygen deficiency. In addition, when there is replacement with an element that can become a tetravalent cation, holes are more likely to occur in the crystal lattice, and holes are generated. Accordingly, when some of V is replaced with an element that becomes divalent or tetravalent in the crystal lattice, the electron conductivity of the active material can be improved, and the internal resistance of the all-solid secondary battery can be reduced. That is, the output current can be increased.

For convenience, an active material that is used in an all-solid secondary battery is described, but the active material may be used not only in all-solid secondary batteries but also in all-solid batteries.

In the chemical formula $Li_{3+a}V_{2-x}M_x(PO_4)_3$, an element represented as M may be an element to be a divalent or tetravalent cation in the crystal structure. In the chemical formula $Li_{3+a}V_{2-x}M_x(PO_4)_3$, an element represented as M is preferably one or more elements selected from the group consisting of Mg, Ca, Ti, Zr, Sr, Ba, Nb, Ta, Cr, Mn, Fe, Co, Ni, Cu, Zn, Mo, Ru, Rh and W. In the chemical formula $Li_{3+a}V_{2-x}M_x(PO_4)_3$, an element represented as M is more preferably one or more elements selected from the group consisting of Mg, Ca, Ti and Zr. In the chemical formula $Li_{3+a}V_{2-x}M_x(PO_4)_3$, an element represented as M is most preferably Ti.

For example, Ti has an ionic radius close to an ionic radius of a (hexacoordinate) trivalent V cation. It is thought that an element having an ionic radius close to an ionic radius of a (hexacoordinate) trivalent V cation easily replaces V. Regarding an element having an ionic radius larger than an ionic radius of a (hexacoordinate) trivalent V cation, when V is replaced with this element, the bond between the element and O in the $Li_{3+a}V_2(PO_4)_3$ crystal tends to be weakened. Therefore, oxygen is easily released during a heat treatment under a reducing atmosphere.

The ionic radius of the (hexacoordinate) trivalent V cation in the active material $Li_{3+a}V_2(PO_4)_3$ is 0.64 Å. On the other hand, the (hexacoordinate) divalent Ti cation has an ionic radius of 0.86 Å, the (hexacoordinate) trivalent Ti cation has an ionic radius of 0.67 Å, and the (hexacoordinate) tetravalent Ti cation has an ionic radius of 0.61 Å. The (hexacoordinate) divalent Mg cation has an ionic radius of 0.72 Å. The (hexacoordinate) divalent Ca cation has an ionic radius of 1.00 Å. The (hexacoordinate) tetravalent Zr cation has an ionic radius of 0.72 Å.

In the above chemical formula $Li_{3+a}V_{2-x}M_x(PO_4)_3$, the replacement amount x of the element M is preferably $0.2 \leq x \leq 1.1$. The replacement amount x of the element M is more preferably $0.45 \leq x \leq 0.9$.

When the replacement amount x of the element M is larger than 1.1, the content of V in the final active material becomes smaller, and the capacity of the active material may decrease. This is because the presence of V whose valence varies is considered essential in a Li release reaction in $Li_{3+a}V_2(PO_4)_3$ used in the positive electrode active material layer 1B and the negative electrode active material layer 2B.

When the replacement amount x of the element M is smaller than 0.2, since the content of M in the final active material becomes smaller and oxygen deficiency and/or holes are unlikely to be generated, improvement in the electron conductivity is small. When the replacement amount of the element M satisfies $0.4 \leq x \leq 0.9$, the capacity of the active material can be improved and the electron conductivity can be improved more suitably.

A preferable range of the replacement amount x of the element M may be wider depending on an element used as the element M. For example, when the element M is Ti, the capacity of the active material can be kept high in a range of $0.05 \leq x \leq 1.3$, and $0.2 \leq x \leq 1.1$ is preferable, and $0.2 \leq x \leq 0.75$ is more preferable. In addition, when the element M is Mg, the capacity of the active material can be kept high in a range of $0.05 \leq x \leq 1.1$, and $0.1 \leq x \leq 0.75$ is preferable, and $0.1 \leq x \leq 0.5$ is more preferable. In addition, when the element M is Ca, the capacity of the active material can be kept high in a range of $0.1 \leq x \leq 1.1$, and $0.1 \leq x \leq 0.75$ is preferable, and $0.1 \leq x \leq 0.5$ is more preferable. In addition, when the element M is Zr, the capacity of the active material can be kept high in a range of $0.05 \leq x \leq 1.3$, and $0.1 \leq x \leq 1.1$ is preferable, and $0.1 \leq x \leq 0.75$ is more preferable.

There is no clear distinction between active materials constituting the positive electrode active material layer 1B and the negative electrode active material layer 2B. Comparing potentials of two compounds, a compound exhibiting a higher potential can be used for the positive electrode active material, and a compound exhibiting a lower potential can be used as the negative electrode active material.

In addition, the positive electrode current collector layer 1A and the negative electrode current collector layer 2A may contain a positive electrode active material and a negative electrode active material, respectively. Content ratios of the active materials included in the current collector layers are not particularly limited as long as the active materials function as a current collector. For example, the volume ratio of the positive electrode current collector/positive electrode active material, or the negative electrode current collector/negative electrode active material is preferably in a range of 90/10 to 70/30, and more preferably in a range of 85/15 to 75/25.

When the positive electrode current collector layer 1A contains a positive electrode active material, the adhesion between the positive electrode current collector layer 1A and the positive electrode active material layer 1B is improved. Similarly, when the negative electrode current collector layer 2A contains a negative electrode active material, the adhesion between the negative electrode current collector layer 2A and the negative electrode active material layer 2B is improved.

"Solid Electrolyte"

The solid electrolyte 3 is preferably a phosphate-based solid electrolyte. Regarding the solid electrolyte 3, a material having low electron conductivity and high lithium ion conductivity is preferably used.

Specifically, for example, it is desirable to select at least one selected from the group consisting of perovskite type compounds such as $La_{0.5}Li_{0.5}TiO_3$, Lisicon compounds such as $Li_{14}Zn(GeO_4)_4$, garnet type compounds such as $Li_7La_3Zr_2O_{12}$, Nasicon type compounds such as $Li_{1.3}Al_{0.3}Ti_{1.7}(PO_4)_3$ and $Li_{1.5}Al_{0.5}Ge_{1.5}(PO_4)_3$, thio-Lisicon compounds such as $Li_{3.25}Ge_{0.25}P_{0.75}S_4$ and $Li_3PS_4$, glass compounds such as $Li_2S—P_2S_5$ and $Li_2O—V_2O_5—SiO_2$, and phosphoric acid compounds such as $LiPO_4$, $Li_{3.5}Si_{0.5}P_{0.5}O_4$ and $Li_{2.9}PO_{3.3}N_{0.46}$.

The solid electrolyte 3 is preferably an oxide-based solid electrolyte containing an element represented as M in the above chemical formula $Li_{3+a}V_{2-x}M_x(PO_4)_3$. That is, an element to be a divalent or tetravalent cation in the crystal structure may be used. For example, one or more elements selected from the group consisting of Mg, Ca, Ti, Zr, Sr, Ba, Nb, Ta, Cr, Mn, Fe, Co, Ni, Cu, Zn, Mo, Ru, Rh and W may be used. In addition, the solid electrolyte 3 is preferably one or more elements selected from the group consisting of Mg, Ca, Ti and Zr, and more preferably Ti. Such a solid electrolyte 3 can be used for, for example, an all-solid secondary battery.

When the solid electrolyte 3 contains the element M, the change in the concentration of the element M at the bonding interface between the positive electrode active material layer 1B containing the solid electrolyte 3 and the element M and/or the negative electrode active material layer 2B is gentle. Therefore, the activation energy at the bonding interface between the positive electrode active material layer 1B and the solid electrolyte 3 and the activation energy of Li ions at the bonding interface between the negative electrode active material layer 2B and the solid electrolyte 3 become small. Here, the activation energy at the bonding interface between the positive electrode active material layer 1B and the solid electrolyte 3 is an energy required for Li ions to pass through the bonding interface between the positive electrode active material layer 1B and the solid electrolyte 3. In addition, the activation energy at the bonding interface between the negative electrode active material layer 2B and the solid electrolyte 3 is an energy required to pass through the bonding interface between the negative electrode active material layer 2B and the solid electrolyte 3. Therefore, Li ions easily move at the bonding interface between the positive electrode active material layer 1B and the solid electrolyte 3 and at the bonding interface between the negative electrode active material layer 2B and the solid electrolyte 3, and Li ion conductivity at the bonding interface is improved. Therefore, the internal resistance of the all-solid secondary battery is reduced.

(Terminal Electrode)

As shown in FIG. 1, the terminal electrodes 5 and 6 are formed to be in contact with side surfaces (exposed end surfaces of the positive electrode layer 1 and the negative electrode layer 2) of the laminate 4. The terminal electrodes 5 and 6 are connected to external terminals and are responsible for transferring electrons into the laminate 4.

For the terminal electrodes 5 and 6, a material having high conductivity is preferably used. For example, silver, gold, platinum, aluminum, copper, tin, nickel, gallium, indium, and alloys thereof can be used.

"Method of Producing all-Solid Secondary Battery"

(Formation of Laminate)

For a method of forming the laminate 4, for example, a simultaneous firing method may be used or a sequential firing method may be used.

The simultaneous firing method is a method in which materials forming layers are laminated and then fired together to produce a laminate. The sequential firing method is a method of sequentially producing layers and is a method in which a firing process is performed whenever a layer is produced. Compared to when the sequential firing method is used, when the simultaneous firing method is used, it is possible to form the laminate 4 with fewer working processes. In addition, compared to when the sequential firing method is used, when the simultaneous firing method is used, the obtained laminate 4 becomes denser. Regarding a method of forming the laminate 4 according to the present embodiment, a known sequential firing method or the like may be used, but a case in which the laminate 4 is produced using the simultaneous firing method will be exemplified below.

The simultaneous firing method includes a process of producing a paste of materials constituting the laminate 4, a process of applying and drying the paste to produce a green sheet, and a process of laminating the green sheets to form a laminated sheet and simultaneously firing them.

First, materials of the positive electrode current collector layer 1A, the positive electrode active material layer 1B, the solid electrolyte 3, the negative electrode active material layer 2B, and the negative electrode current collector layer 2A which constitute the laminate 4 are made into pastes.

A method of making materials into pastes is not particularly limited. For example, a paste may be obtained by mixing powders of materials in a vehicle. Here, the vehicle is a general term for a medium in a liquid phase. The vehicle includes a solvent, a binder, and the like.

According to such a method, a paste for the positive electrode current collector layer 1A, a paste for the positive electrode active material layer 1B, a paste for the solid electrolyte 3, a paste for the negative electrode active material layer 2B, and a paste for the negative electrode current collector layer 2A are produced.

Next, a green sheet is produced. The green sheet is obtained by applying the produced paste to a substrate such as a polyethylene terephthalate (PET) film, performing drying as necessary, and then peeling off the substrate. A paste applying method is not particularly limited. For example, known methods such as screen printing, application, transferring, and a doctor blade method can be used.

Next, the produced green sheets are laminated in a desired order and number of laminates to form a laminated sheet. When the green sheets are laminated, as necessary, alignment, cutting and the like are performed. For example, when a parallel type or serial-parallel type battery is produced, preferably alignment is performed so that an end surface of the positive electrode current collector layer and an end surface of the negative electrode current collector layer do not match, and the green sheets are laminated.

The laminated sheet can be prepared using a known method. For example, the laminated sheet may be produced using a method in which a positive electrode active material layer unit and a negative electrode active material layer unit to be described below are prepared and these are laminated.

First, a paste for the solid electrolyte 3 is applied to a substrate such as a PET film by a doctor blade method and dried to form a sheet-like solid electrolyte 3. Next, a paste for the positive electrode active material layer 1B is printed on the solid electrolyte 3 by screen printing and dried to form the positive electrode active material layer 1B. Next, a paste for the positive electrode current collector layer 1A is printed on the positive electrode active material layer 1B by screen printing and dried to form the positive electrode current collector layer 1A. In addition, a paste for the positive electrode active material layer 1B is printed on the positive electrode current collector layer 1A by screen printing and dried to form the positive electrode active material layer 1B.

Then, the PET film is peeled off and thereby a positive electrode active material layer unit is obtained. The positive electrode active material layer unit is a laminated sheet in which the solid electrolyte 3/the positive electrode active material layer 1B/the positive electrode current collector layer 1A/the positive electrode active material layer 1B are laminated in this order.

In the same procedures, a negative electrode active material layer unit is produced. The negative electrode active material layer unit is a laminated sheet in which the solid electrolyte 3/the negative electrode active material layer 2B/the negative electrode current collector layer 2A/the negative electrode active material layer 2B are laminated in this order.

Next, one positive electrode active material layer unit and one negative electrode active material layer unit are laminated. In this case, the solid electrolyte 3 of the positive electrode active material layer unit, the negative electrode active material layer 2B of the negative electrode active material layer unit or the positive electrode active material layer 1B of the positive electrode active material layer unit and the solid electrolyte 3 of the negative electrode active material layer unit are laminated in contact with each other. Thus, a laminated sheet in which the positive electrode active material layer 1B/the positive electrode current collector layer 1A/the positive electrode active material layer 1B/the solid electrolyte 3/the negative electrode active material layer 2B/the negative electrode current collector layer 2A/the negative electrode active material layer 2B/the solid electrolyte 3 are laminated in this order is obtained. Next, de-binding and firing are performed to produce an all-solid battery laminate.

Here, when the positive electrode active material layer unit and the negative electrode active material layer unit are laminated, the units are shifted and laminated so that the positive electrode current collector layer 1A of the positive electrode active material layer unit extends only to one end surface, and the negative electrode current collector layer 2A of the negative electrode active material layer unit extends only to the other surface. Then, on the surface of the laminate in which units are laminated and on the surface of which the solid electrolyte 3 is not present, a sheet for the solid electrolyte 3 having a predetermined thickness is additionally laminated to obtain a laminated sheet. De-binding and firing can be performed by firing, for example, under a nitrogen atmosphere at a temperature of 600° C. to 1,000° C. The de-binding and firing maintaining time is, for example, 0.1 to 6 hours.

Next, the produced laminated sheets are compressed together. Compression is preferably performed while heating. The heating temperature during compression can be, for example, 40 to 95° C., and is preferably 50 to 80° C.

Next, the compressed laminated sheets are simultaneously fired together to form the laminate 4 made of a sintered component. The laminated sheet is fired by heating, for example, under a nitrogen atmosphere at 600° C. to 1,000° C. A firing time is, for example, 0.1 to 3 hours.

The obtained sintered component (the laminate 4) may be put into a cylindrical container together with an abrasive material such as alumina and subjected to barrel polishing. Thereby, it is possible to chamfer corners of the laminate 4. As another method, the laminate 4 may be polished by sandblasting. This method is preferable because only a specific part can be cut.

The laminate 4 is obtained through the above processes.

When the terminal electrodes 5 and 6 are formed at ends of the produced laminate 4, an all-solid lithium ion secondary battery can be produced. The terminal electrodes 5 and 6 can be produced by a known method, and for example, can be produced by a sputtering method.

As described above, the active material according to the present embodiment exhibits high electron conductivity.

In addition, when $Li_{3+a}V_{2-x}M_x(PO_4)_3$ (−0.3≤a≤0.7, more preferably −0.1≤a≤0.4, and 0<x≤1.4, more preferably 0.2≤x≤1.1), which has higher electron conductivity than the active material $Li_3V_2(PO_4)_3$, is used as a positive electrode active material or a negative electrode active material of the all-solid secondary battery, the electron conductivity of the positive electrode active material layer or the negative electrode active material layer in the all-solid secondary battery can be improved. That is, the internal resistance of the all-solid secondary battery can be reduced.

While preferable embodiment examples of the present disclosure have been described above in detail with reference to the drawings, it is needless to say that configurations and combinations thereof in the embodiments are only examples, and the present disclosure is not limited to such examples. For configurations in the embodiments, additions, omissions, substitutions, and various other modifications of the configurations can be made without departing from the scope of the present disclosure.

EXAMPLES

Examples 1 to 10 and Comparative Examples 1 and 2

The laminate 4 in which the solid electrolyte 3/the positive electrode active material layer 1B/the positive electrode current collector layer 1A/the positive electrode active material layer 1B/the solid electrolyte 3/the negative electrode active material layer 2B/the negative electrode current collector layer 2A/the negative electrode active material layer 2B/the solid electrolyte 3 were laminated in this order was produced by a simultaneous firing method. The structure of layers was as follows.

The positive electrode current collector layer 1A and the negative electrode current collector layer 2A: $Cu+Li_3V_2(PO_4)_3$ The positive electrode active material layer 1B and the negative electrode active material layer 2B: $Li_{3+a}V_{2-x}Ti_x(PO_4)_3$ (where, a=0, 0≤x≤1.5)

The solid electrolyte 3: $Li_{1.3}Al_{0.3}Ti_{1.7}(PO_4)_3$

The number of layers was 25. They were produced so that the respective thicknesses of the positive electrode current collector layer 1A, the negative electrode current collector layer 2A, the positive electrode active material layer 1B and the negative electrode active material layer 2B after firing were 3 μm, and the thickness of the solid electrolyte layer interposed between the positive electrode active material layer 1B and the negative electrode active material layer 2B after firing was 20 μm.

The temperature during simultaneous firing was 800° C., and the firing time was 1 hour.

Hereinafter, $Li_{3+a}V_{2-x}Ti_x(PO_4)_3$ with a=0 will be described as $Li_3V_{2-x}Ti_x(PO_4)_3$ in some cases.

The electron conductivity [S/cm] of the active material used for the positive electrode active material layer 1B and the negative electrode active material layer 2B was measured. In addition, the internal resistance [Q] of the laminate 4 produced using the active material was measured.

The electron conductivity [S/cm] of the active material used for the positive electrode active material layer 1B and the negative electrode active material layer 2B was measured as follows.

An active material powder was formed into a disk (with a size of φ10 mm and a thickness of about 2 mm), and fired at 850 to 1,000° C. under a nitrogen atmosphere so that the relative density was 92% or more, and thereby a disk sintered component was obtained. The surface of the obtained disk sintered component was polished, sizes (diameter R, thickness t) were measured, Pt sputtering was then performed using a magnetron sputtering device, a Pt electrode was formed on both surfaces of the disk sintered component, and thereby a sample for measuring electron conductivity was produced. 1 V was applied to the produced sample for measuring electron conductivity using an impedance analyzer (1260 commercially available from Solartron), and the electron conductivity was calculated from the current value I' after 15 minutes. $\sigma_e = I' \times t / (\pi (R/2)^2)$ was used as the calculation formula.

The internal resistance [Ω] of the laminate 4 was measured as follows.

Regarding the terminal electrodes 5 and 6 of the laminate 4, a resin Ag paste was applied to form electrodes and CC 20 μA charging was then performed up to 1.6 V. After 10 minutes of rest (the voltage immediately before start of discharging in this case was V), the internal resistance was calculated from the voltage value V' 1 second immediately after CC 20 μA discharging was started. The internal resistance=(V−V')/20μ was used as the calculation formula.

TABLE 1

|  | $Li_3V_{2-x}Ti_x(PO_4)_3$ x | Electron conductivity S/cm | Internal resistance Ω |
|---|---|---|---|
| Example 1 | 0.03 | $2.0 \times 10^{-7}$ | 4k |
| Example 2 | 0.05 | $2.7 \times 10^{-7}$ | 500 |
| Example 3 | 0.1 | $3.0 \times 10^{-7}$ | 300 |
| Example 4 | 0.2 | $9.3 \times 10^{-7}$ | 200 |
| Example 5 | 0.5 | $8.7 \times 10^{-7}$ | 190 |
| Example 6 | 0.75 | $7.4 \times 10^{-7}$ | 190 |
| Example 7 | 1.0 | $6.6 \times 10^{-7}$ | 200 |
| Example 8 | 1.1 | $4.7 \times 10^{-7}$ | 240 |
| Example 9 | 1.3 | $3.5 \times 10^{-7}$ | 600 |
| Example 10 | 1.4 | $2.3 \times 10^{-7}$ | 5k |
| Comparative Example 1 | 0 | $7.4 \times 10^{-8}$ | 20k |
| Comparative Example 2 | 1.5 | $9.6 \times 10^{-8}$ | 21k |

As can be understood from Table 1, the active material in which some of V in $Li_3V_2(PO_4)_3$ was replaced with Ti exhibited an increase in the electron conductivity, and the laminate 4 containing the active material exhibited a decrease in the internal resistance. In particular, when the replacement amount x of Ti in the chemical formula $Li_3V_{2-x}Ti_x(PO_4)_3$ was 0.2 to 1.1 (Examples 4 to 8), the electron conductivity was $4.7 \times 10^{-7}$ S/cm or more, and the internal resistance was 240Ω or less.

While not bound by theory, it is thought that such an increase in the electron conductivity and decrease in the internal resistance were caused by the valence that was able to be obtained when Ti was ionized in the crystal lattice of the active material and the ionic radius of Ti ions. When Ti in the crystal lattice of the active material became a divalent cation, oxygen deficiency was more likely to occur in the crystal lattice and free electrons were generated. When Ti in the crystal lattice of the active material became a tetravalent cation, holes were more likely to occur in the crystal lattice and holes were generated. The ionic radius (divalent cation and hexacoordinate, 0.86 Å) of Ti, which was larger than the ionic radius (trivalent cation and hexacoordinate, 0.64 Å) of V, weakened the bonding force between Ti—O in the crystal lattice of the active material, and thus release of oxygen was promoted during a heat treatment and oxygen deficiency was generated. This was thought to be the cause of the electron conductivity of the active material increasing.

On the other hand, when V was not replaced with Ti (Comparative Example 1), the electron conductivity was $7.4 \times 10^{-8}$ S/cm, which was about one order of magnitude lower than those of Examples 4 to 8. In addition, when there was replacement with a large amount of Ti (Comparative Example 2), almost no improvement in the electron conductivity was observed. In addition, when there was replacement with a large amount of Ti, the internal resistance increased.

Examples 11 to 20 and Comparative Example 3

The conditions of Examples 11 to 20 were the same as those of Examples 1 to 10 except that the positive electrode active material layer 1B and the negative electrode active material layer 2B: $Li_{3+a}V_{2-x}Ti_x(PO_4)_3$ (where, a=, 0≤x≤1.5) in Examples 1 to 10 were changed to $Li_{3+a}V_{2-x}Mg_x(PO_4)_3$ (where, a=0, 0≤x≤1.5). That is, the electron conductivity [S/cm] and the internal resistance [Ω] were measured under the same conditions as in Examples 1 to 10.

TABLE 2

|  | $Li_3V_{2-x}Mg_x(PO_4)_3$ x | Electron conductivity S/cm | Internal resistance Ω |
|---|---|---|---|
| Example 11 | 0.03 | $9.0 \times 10^{-8}$ | 6k |
| Example 12 | 0.05 | $1.4 \times 10^{-7}$ | 600 |
| Example 13 | 0.1 | $3.2 \times 10^{-7}$ | 340 |
| Example 14 | 0.2 | $3.1 \times 10^{-7}$ | 300 |
| Example 15 | 0.5 | $2.9 \times 10^{-7}$ | 400 |
| Example 16 | 0.75 | $2.4 \times 10^{-7}$ | 470 |
| Example 17 | 1.0 | $1.9 \times 10^{-7}$ | 530 |
| Example 18 | 1.1 | $1.7 \times 10^{-7}$ | 580 |
| Example 19 | 1.3 | $1.3 \times 10^{-7}$ | 1k |
| Example 20 | 1.4 | $9.9 \times 10^{-8}$ | 12k |
| Comparative Example 1 | 0 | $7.4 \times 10^{-8}$ | 20k |
| Comparative Example 3 | 1.5 | $7.0 \times 10^{-8}$ | 25k |

As can be understood from Table 2, the active material in which some of V in $Li_3V_2(PO_4)_3$ was replaced with Mg exhibited an increase in the electron conductivity compared to the active material in which any of V was not replaced with Mg. The laminate 4 containing the active material exhibited a decrease in the internal resistance. In particular, when the replacement amount x of Mg in the chemical formula $Li_3V_{2-x}Mg_x(PO_4)_3$ was 0.1 to 1.1 (Examples 13 to 18), an increase in the electron conductivity and a decrease in the internal resistance were observed.

While not bound by theory, it was thought such an increase in the electron conductivity and decrease in the internal resistance were caused by the valence that was able to be obtained when Mg was ionized in the crystal lattice of the active material and the ionic radius of Mg ions. When Mg in the crystal lattice of the active material became a divalent cation, oxygen deficiency was more likely to occur in the crystal lattice and free electrons were generated. The ionic radius (divalent cation and hexacoordinate, 0.72 Å) of Mg, which was larger than the ionic radius (trivalent cation and hexacoordinate, 0.64 Å) of V, weakened the bonding force between Mg—O in the crystal lattice of the active material, and thus release of oxygen was promoted during a heat treatment, and oxygen deficiency was generated. This was thought to be the cause of the electron conductivity of the active material increasing.

On the other hand, when there was replacement with a large amount of Mg (Comparative Example 3), no improvement in the electron conductivity was observed. In addition, when there was replacement with a large amount of Mg, the internal resistance increased.

Examples 21 to 30 and Comparative Example 4

The conditions of Examples 21 to 30 were the same as those of Examples 1 to 10 except that the positive electrode active material layer 1B and the negative electrode active material layer 2B: $Li_3V_{2-x}Ti_x(PO_4)_3$ (where, $0 \leq x \leq 1.5$) in Examples 1 to 10 were changed to $Li_3V_{2-x}Ca_x(PO_4)_3$ (where, $0 \leq x \leq 1.5$). The electron conductivity [S/cm] and the internal resistance [Ω] were measured under the same conditions as in Examples 1 to 10.

TABLE 3

| | $Li_3V_{2-x}Ca_x(PO_4)_3$ x | Electron conductivity S/cm | Internal resistance Ω |
|---|---|---|---|
| Example 21 | 0.03 | $7.0 \times 10^{-8}$ | 7k |
| Example 22 | 0.05 | $6.6 \times 10^{-8}$ | 2k |
| Example 23 | 0.1 | $9.4 \times 10^{-7}$ | 270 |
| Example 24 | 0.2 | $8.7 \times 10^{-7}$ | 220 |
| Example 25 | 0.5 | $7.3 \times 10^{-7}$ | 230 |
| Example 26 | 0.75 | $5.9 \times 10^{-7}$ | 250 |
| Example 27 | 1.0 | $3.8 \times 10^{-7}$ | 250 |
| Example 28 | 1.1 | $3.0 \times 10^{-7}$ | 590 |
| Example 29 | 1.3 | $2.0 \times 10^{-7}$ | 2k |
| Example 30 | 1.4 | $1.1 \times 10^{-7}$ | 14k |
| Comparative Example 1 | 0 | $7.4 \times 10^{-8}$ | 20k |
| Comparative Example 4 | 1.5 | $4.8 \times 10^{-8}$ | 41k |

As can be understood from Table 3, the active material in which some of V in $Li_3V_2(PO_4)_3$ was replaced with Ca exhibited an increase in the electron conductivity, and the laminate 4 containing the active material exhibited a decrease in the internal resistance. In particular, when the replacement amount x of Ca in the chemical formula $Li_3V_{2-x}Ca_x(PO_4)_3$ was 0.1 to 1.1 (Examples 23 to 28), a significant increase in the electron conductivity and decrease in the internal resistance were observed.

While not bound by theory, it is thought that such an increase in the electron conductivity and decrease in the internal resistance were caused by the valence that was able to be obtained when Ca was ionized in the crystal lattice of the active material and the ionic radius of Ca ions. When Ca in the crystal lattice of the active material became a divalent cation, oxygen deficiency was more likely to occur in the crystal lattice and free electrons were generated. The ionic radius (divalent cation and hexacoordinate, 1.00 Å) of Ca, which was larger than the ionic radius (trivalent cation and hexacoordinate, 0.64 Å) of V, weakened the bonding force between Ca—O in the crystal lattice of the active material, and thus release of oxygen was promoted during a heat treatment and oxygen deficiency was generated. This was thought to be the cause of the electron conductivity of the active material increasing.

On the other hand, when there was replacement with a large amount of Ca (Comparative Example 4), no improvement in the electron conductivity was observed. In addition, when there was replacement with a large amount of Ca, the internal resistance increased.

Examples 31 to 40 and Comparative Example 5

The conditions of Examples 31 to 40 were the same as those of Examples 1 to 10 except that the positive electrode active material layer 1B and the negative electrode active material layer 2B: $Li_3V_{2-x}Ti_x(PO_4)_3$ (where, $0 \leq x \leq 1.5$) in Examples 1 to 10 were changed to $Li_3V_{2-x}Zr_x(PO_4)_3$ (where, $0 \leq x \leq 1.5$). The electron conductivity [S/cm] and the internal resistance [Ω] were measured under the same conditions as in Examples 1 to 10.

TABLE 4

| | $Li_3V_{2-x}Zr_x(PO_4)_3$ X | Electron conductivity S/cm | Internal resistance Ω |
|---|---|---|---|
| Example 31 | 0.03 | $9.8 \times 10^{-8}$ | 7k |
| Example 32 | 0.05 | $1.2 \times 10^{-7}$ | 800 |
| Example 33 | 0.1 | $3.2 \times 10^{-7}$ | 500 |
| Example 34 | 0.2 | $3.1 \times 10^{-7}$ | 400 |
| Example 35 | 0.5 | $2.9 \times 10^{-7}$ | 380 |
| Example 36 | 0.75 | $2.4 \times 10^{-7}$ | 350 |
| Example 37 | 1.0 | $1.9 \times 10^{-7}$ | 380 |
| Example 38 | 1.1 | $1.7 \times 10^{-7}$ | 400 |
| Example 39 | 1.3 | $1.2 \times 10^{-7}$ | 670 |
| Example 40 | 1.4 | $9.9 \times 10^{-8}$ | 11k |
| Comparative Example 1 | 0 | $7.4 \times 10^{-8}$ | 20k |
| Comparative Example 5 | 1.5 | $6.8 \times 10^{-8}$ | 30k |

As can be understood from Table 4, the active material in which some of V in $Li_3V_2(PO_4)_3$ was replaced with Zr exhibited an increase in the electron conductivity and the laminate 4 containing the active material exhibited a decrease in the internal resistance. In particular, when the replacement amount x of Zr in the chemical formula $Li_3V_{2-x}Zr_x(PO_4)_3$ was 0.1 to 1.1 (Examples 33 to 38), an increase in the electron conductivity and a decrease in the internal resistance were observed.

While not bound by theory, it is thought that such an increase in the electron conductivity and decrease in the internal resistance were caused by the valence that was able to be obtained when Zr was ionized in the crystal lattice of the active material and the ionic radius of Zr ions. When Zr in the crystal lattice of the active material became a tetravalent cation, holes were more likely to occur in the crystal lattice, and holes were generated. The ionic radius (tetravalent cation and hexacoordinate, 0.72 Å) of Zr, which was larger than the ionic radius (trivalent cation and hexacoordinate, 0.64 Å) of V, weakened the bonding force between Zr—O in the crystal lattice of the active material, and thus release of oxygen was promoted during a heat treatment and oxygen deficiency was generated. This was thought to be the cause of the electron conductivity of the active material increasing.

On the other hand, when there was replacement with a large amount of Zr (Comparative Example 5), no improvement in the electron conductivity was observed. In addition, when there was replacement with a large amount of Zr, the internal resistance increased.

Examples 41 to 50 and Comparative Examples 11 and 12

The conditions of Examples 41 to 50 were the same as those in Examples 1 to 10 except that the positive electrode active material layer 1B and the negative electrode active material layer 2B: $Li_{3+a}V_{2-x}Ti_x(PO_4)_3$ (where, a=0, $0 \leq x \leq 1.5$) in Examples 1 to 10 were changed to $Li_3V_{2-x}Ti_xCa_x(PO_4)_3$ (where, $-0.35 \leq a \leq 0.7$, x=1). The electron conductivity [S/cm] and the internal resistance [0] were measured under the same conditions as in Examples 1 to 10.

TABLE 5

|  | $Li_{3+a}V_{2-x}Ti_x(PO_4)_3$ | | Electron conductivity | Internal resistance |
|---|---|---|---|---|
|  | a | x | S/cm | Ω |
| Example 41 | −0.3 | 1.0 | $1.9 \times 10^{-7}$ | 700 |
| Example 42 | −0.2 | 1.0 | $2.5 \times 10^{-7}$ | 430 |
| Example 43 | 0 | 1.0 | $6.6 \times 10^{-7}$ | 200 |
| Example 44 | 0.1 | 1.0 | $8.2 \times 10^{-7}$ | 190 |
| Example 45 | 0.2 | 1.0 | $8.7 \times 10^{-7}$ | 180 |
| Example 46 | 0.3 | 1.0 | $5.8 \times 10^{-7}$ | 220 |
| Example 47 | 0.4 | 1.0 | $4.0 \times 10^{-7}$ | 290 |
| Example 48 | 0.5 | 1.0 | $3.3 \times 10^{-7}$ | 360 |
| Example 49 | 0.6 | 1.0 | $2.9 \times 10^{-7}$ | 400 |
| Example 50 | 0.7 | 1.0 | $2.2 \times 10^{-7}$ | 670 |
| Comparative Example 11 | −0.4 | 1.0 | $7.8 \times 10^{-8}$ | 17k |
| Comparative Example 12 | 0.8 | 1.0 | $9.5 \times 10^{-8}$ | 13k |

As can be understood from Table 5, the active material in which the composition amount of Li in $Li_{3+a}V_{2-x}Ti_x(PO_4)_3$ was adjusted to be within a range of $-0.3 \leq a \leq 0.7$ exhibited an increase in the electron conductivity, and a decrease in the internal resistance of the active material was exhibited. In particular, when the range was adjusted to $-0.2 \leq a \leq 0.6$ (Example 42 to Example 49), a significant increase in the electron conductivity and decrease in the internal resistance were observed.

While not bound by theory, such an increase in the electron conductivity and decrease in the internal resistance. This was thought to be cause of the electron conductivity of the active material increasing and the internal resistance decreasing.

On the other hand, when $a \leq -0.4$ and $0.85 \leq a$ were satisfied, no improvement in the electron conductivity was observed. In addition, the internal resistance increased.

REFERENCE SIGNS LIST

1 First electrode layer, positive electrode layer
1A Positive electrode current collector layer
1B Positive electrode active material layer
2 Second electrode layer and negative electrode layer
2A Negative electrode current collector layer
2B Negative electrode active material layer
3 Solid electrolyte
4 Laminate
5, 6 Terminal electrodes
10 All-solid secondary battery

The invention claimed is:

1. An active material which is represented by a chemical formula $Li_{3+a}V_{2-x}M_x(PO_4)_3$, wherein:
   $0.1 \leq a \leq 0.2$ and $0.2 \leq x \leq 1.1$ are satisfied, and
   M is Ti.

2. An all-solid secondary battery comprising the active material according to claim 1.

3. The all-solid secondary battery according to claim 2, comprising an oxide-based solid electrolyte layer containing an element represented as M in the chemical formula of the active material.

4. The all-solid secondary battery according to claim 2, comprising
   a positive electrode current collector layer and a negative electrode current collector layer,
   wherein the positive electrode current collector layer contains a positive electrode active material,
   wherein the negative electrode current collector layer contains a negative electrode active material,
   wherein a ratio between the content of the positive electrode current collector and the positive electrode active material contained in the positive electrode current collector layer is in a range of 90/10 to 70/30, and
   wherein a ratio between the content of the negative electrode current collector and the negative electrode active material contained in the negative electrode current collector layer is in a range of 90/10 to 70/30.

5. The all-solid secondary battery according to claim 3, comprising
   a positive electrode current collector layer and a negative electrode current collector layer,
   wherein the positive electrode current collector layer contains a positive electrode active material,
   wherein the negative electrode current collector layer contains a negative electrode active material,
   wherein a ratio between the content of the positive electrode current collector and the positive electrode active material contained in the positive electrode current collector layer is in a range of 90/10 to 70/30, and
   wherein a ratio between the content of the negative electrode current collector and the negative electrode active material contained in the negative electrode current collector layer is in a range of 90/10 to 70/30.

6. The all-solid secondary battery according to claim 2, wherein an electron conductivity is equal to $1.7 \times 10^{-7}$ S/cm or more.

7. The active material according to claim 1, wherein the active material consists of an active material compound represented by the chemical formula $Li_{3+a}V_{2-x}M_x(PO_4)_3$.

8. The active material according to claim 1, wherein $0.9 \leq x \leq 1.1$ is satisfied.

* * * * *